US010349258B2

(12) United States Patent
Ramachandra et al.

(10) Patent No.: US 10,349,258 B2
(45) Date of Patent: Jul. 9, 2019

(54) IDENTIFICATION OF POTENTIALLY NEIGHBORING NETWORK NODES IN A WIRELESS COMMUNICATION NETWORK

(71) Applicant: TELEFONAKTIEBOLAGET LM ERICSSON (PUBL), Stockholm (SE)

(72) Inventors: Pradeepa Ramachandra, Linköping (SE); Mehdi Amirijoo, Linköping (SE); Andreas Bergström, Vikingstad (SE); Fredrik Gunnarsson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 148 days.

(21) Appl. No.: 15/302,227

(22) PCT Filed: Aug. 24, 2016

(86) PCT No.: PCT/SE2016/050788
§ 371 (c)(1),
(2) Date: Oct. 6, 2016

(87) PCT Pub. No.: WO2018/038653
PCT Pub. Date: Mar. 1, 2018

(65) Prior Publication Data
US 2018/0063692 A1    Mar. 1, 2018

(51) Int. Cl.
*H04W 8/00* (2009.01)
*H04W 24/02* (2009.01)
(Continued)

(52) U.S. Cl.
CPC .......... *H04W 8/005* (2013.01); *H04W 24/02* (2013.01); *H04W 40/244* (2013.01);
(Continued)

(58) Field of Classification Search
CPC .. H04W 36/0083; H04W 36/14; H04W 48/12
See application file for complete search history.

(56) References Cited

U.S. PATENT DOCUMENTS 5,946,621 A * 8/1999 Chheda ................. H04W 36/18
370/332
8,526,949 B2 * 9/2013 Dwyer .............. H04W 36/0061
455/435.2
(Continued)

FOREIGN PATENT DOCUMENTS

WO     2012008887 A1    1/2012

OTHER PUBLICATIONS

Dahlén, Anders, "Evaluations of LTE Automatic Neighbor Relations," IEEE, IEEE Vehicular Technology Conference in Spring, 2011 ISBN: 978-1-4244-8331-0/11, 5 pages.
(Continued)

*Primary Examiner* — Melanie Jagannathan
(74) *Attorney, Agent, or Firm* — Rothwell, Figg, Ernst & Manbeck, p.c.

(57) ABSTRACT

Identification of network nodes (110a-c) of a first Radio Access Technology, "RAT", and of a wireless communication network (100), which network nodes (110a-c) are at least potentially neighboring each other. Multiple information sets associated with multiple communication devices (120a-c), respectively, are obtained (204a-b; 401). Each communication device (120a-c) supports both the first RAT and another, second RAT. Each information set, thus associated with a communication device (120a), identifies a network node (110a) of the first RAT, and one or more network nodes (111a) of the second RAT that have been identified by the communication device (120a) when the communication device (120a) was associated with a communicative connection to said identified network node (110a) of the first RAT. The network nodes (110a-b) of the first RAT that are at least potentially neighboring each other are then identified (205; 402) based on the obtained multiple information sets.

16 Claims, 6 Drawing Sheets

(51) Int. Cl.
*H04W 36/00* (2009.01)
*H04W 40/24* (2009.01)
*H04W 48/16* (2009.01)
*H04W 84/18* (2009.01)

(52) U.S. Cl.
CPC ........ *H04W 48/16* (2013.01); *H04W 36/0083* (2013.01); *H04W 84/18* (2013.01)

(56) References Cited

U.S. PATENT DOCUMENTS

| | | | | |
|---|---|---|---|---|
| 8,532,658 | B2* | 9/2013 | Knisely | H04W 48/14 370/331 |
| 8,842,633 | B2* | 9/2014 | Dwyer | H04W 36/0066 370/331 |
| 9,357,414 | B2* | 5/2016 | Kim | H04W 24/10 |
| 2009/0191862 | A1* | 7/2009 | Amirijoo | H04W 36/0083 455/424 |
| 2010/0278066 | A1* | 11/2010 | Hole | H04W 36/0061 370/252 |
| 2010/0279677 | A1* | 11/2010 | Dwyer | H04W 48/16 455/422.1 |
| 2015/0105084 | A1* | 4/2015 | Bontu | H04W 36/0072 455/437 |
| 2015/0245260 | A1 | 8/2015 | Engstrom et al. | |
| 2016/0183147 | A1* | 6/2016 | Da Silva | H04W 36/0055 370/331 |

OTHER PUBLICATIONS

International Search Report and Written Opinion issued in International Application No. PCT/SE2016/050788, dated Apr. 20, 2017, 15 pages.

Mitsubishi Electric, "From large lists of potential neighbour cells to self-optimised neighbour cell lists," 3GPP TSG SA WG5 and RAN WG3 LTE Adhoc, R3-071239, Sophia-Antipolis, France, Jun. 13-14, 2007, 4 pages.

\* cited by examiner

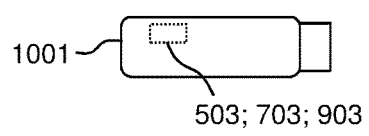
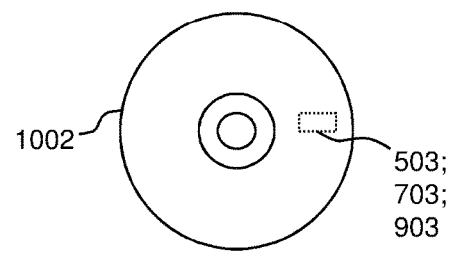
Fig. 10a        Fig. 10b
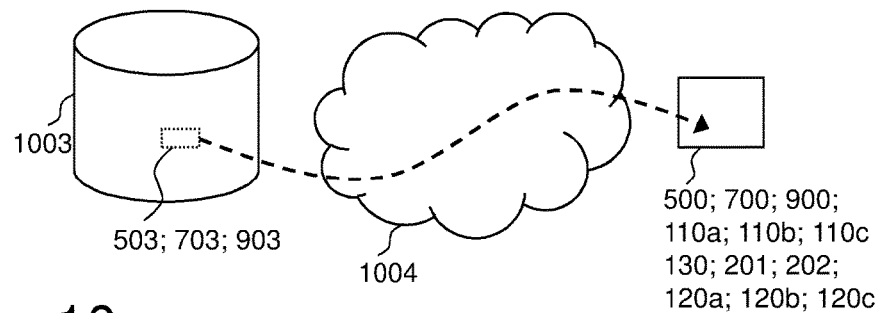
Fig. 10c

IDENTIFICATION OF POTENTIALLY NEIGHBORING NETWORK NODES IN A WIRELESS COMMUNICATION NETWORK

CROSS REFERENCE TO RELATED APPLICATION(S)

This application is a 35 U.S.C. § 371 National Phase Entry Application from PCT/SE2016/050788, filed Aug. 24, 2016, designating the United States, the disclosure of which is incorporated by reference.

TECHNICAL FIELD

Embodiments herein concern methods and arrangements relating to identification of at least potentially neighboring network nodes in a wireless communication network, e.g. a telecommunication network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) is used for the transmission path from the base station to the wireless device. The expression uplink (UL) is used for the transmission path in the opposite direction i.e. from the wireless device to the base station.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G). A design principle under consideration for 5G wireless communication networks is to base it on an ultra-lean design. This implies that "always on signals", such as reference signals in LTE, shall be avoided in the network as much as possible. The expected benefit from this design principle is expected to be significantly lower network energy consumption, better scalability, higher degree of forward compatibility, lower interference from system overhead signals and consequently higher throughput in low load scenario, and also improved support for user centric beam-forming.

Advanced Antenna Systems (AAS) is an area where technology has advanced significantly in recent years and where we also foresee a rapid technology development in the years to come. Hence it is natural to assume that advanced antenna systems in general and massive Multiple Input Multiple Output (MIMO) transmission and reception in particular, will be a cornerstone in a future 5G wireless communication network.

As beam-forming becomes increasingly popular and capable it becomes natural to use it not only for transmission of data but also for transmission of control information. This is one motivation behind the relatively new control channel in LTE known as enhanced Physical Downlink Control CHannel (ePDCCH). When a control channel is beam-formed, the cost of transmitting the overhead control information can be reduced due to the increased link budget provided by additional antenna gain. This is a good property that likely will be utilized also for 5G, perhaps to an even larger degree than what is possible in the currently in LTE.

Despite advanced radio network planning tools, it is very difficult to predict the radio propagation in detail. As a consequence, it is difficult to predict which base stations that needs to have a relation and perhaps also a direct connection prior to the network deployment. This is addressed in LTE, where UEs can be requested to retrieve unique information from the system information broadcast of unknown base stations and report to the serving base station. Such information is used to convey messages to the unknown base station via the core network, which maintains a lookup table from a unique identifier to an established S1 connection. One such message is used to request transport network layer address information necessary for a direct base station to base station connection for the X2 interface.

The mobility procedure in 5G is planned to be beam based, where the reference signals defining such a beam is defined via specific Reference Signals (RS), that may be named Mobility Reference Signals (MRS), and can be activated by the node/s when a wireless communication device, such as a UE, is in need of making a handover. Thus the mobility procedure may be enabled via turning on a MRS on a selected set of beams, that may be named MRS beams, for the wireless communication device to measure and report back after which a network node decides on which such MRS beam will become the new serving beam for the wireless communication device in question. Which MRS beams to be transmitted by network nodes may depend on several factors including the current serving beam. Therefore, a network node may maintain a beam-to-beam relation table, that simply may be named a beam relation table, in order to refer which beam needs to be transmitted by the network node(s) to aid mobility of the wireless communication device.

In order for smooth operation of the mobility procedure in 5G, a 5G network node is need to have a concrete list of neighboring 5G nodes which can be handover candidates for wireless communication devices. In LTE, a corresponding neighbor relations table is established by using "always on signals" from the neighboring node(s). This is well studied for the Automatic Neighbor Relations (ANR) concept, see e.g. Evaluations of LTE Automatic Neighbor Relations", Fredrik Gunnarsson et al, conference paper, Proceedings of the 73rd IEEE Vehicular Technology Conference, VTC Spring 2011, 15-18 May 2011, Budapest, Hungary.

SUMMARY

In view of the above, an object is to provide one or more improvements with regard to establishing neighbour node relations in a wireless communication network.

It has been realized that 5G based wireless communication networks will most likely be introduced by the operators amongst their existing networks, e.g. 4G as LTE, to begin with. In this way, an operator can potentially distribute their CAPital EXpenditures (CAPEX) over time and gradually shift their network to the new radio access technology.

However, when 5G nodes are introduced in an existing network, it has further been realized that the 5G nodes either a) needs to be directly configured by a Operation Administration and Maintenance (OAM) system in use or b) needs to transmit additional system/node information related reference signals, in order to establish base station relations as described above. In the former case, i.e. in the case of OAM based planning, the planning tool needs to be very advanced and/or complex in order to e.g. consider the beam forming capabilities of 5G nodes, the propagation environments of their deployment etc. In the latter case, i.e. additional system/node information reference signal transmission, the above mentioned ultra-lean design principle of 5G is negatively affected.

Hence, at least for 5G, it is desirable with a method for establishing these neighbour relations, which can be as automated as possible but that still keeps any new reference signal transmissions that may be needed to a minimum.

According to a first aspect of embodiments herein, the object is achieved by a first method for identifying network nodes of a first Radio Access Technology (RAT) and of a wireless communication network. The network nodes being at least potentially neighboring each other. Multiple information sets associated with multiple communication devices, respectively, are obtained, where each communication device supports both the first RAT and another, second RAT. Each information set, thus associated with a communication device, identifies a network node of the first RAT, and one or more network nodes of the second RAT that have been identified by the communication device when the communication device was associated with a communicative connection to said identified network node of the first RAT. It is then identified, based on the obtained multiple information sets, network nodes of the first RAT that are at least potentially neighboring each other.

According to a second aspect of embodiments herein, the object is achieved by a computer program comprising instructions that when executed by an arrangement causes the arrangement to perform the first method according to the first aspect.

According to a third aspect of embodiments herein, the object is achieved by a carrier comprising the computer program according to the second aspect.

According to a fourth aspect of embodiments herein, the object is achieved by a second method, performed by a network node of a first RAT and of a wireless communication network, for supporting identification of network nodes of the first RAT that are at least potentially neighboring each other. The network node obtains an information set associated with a communication device supporting both the first RAT and another, second RAT. The information set identifies said network node of the first RAT, and one or more network nodes of the second RAT that have been identified by the communication device when the communication device was associated with a communicative connection to said identified network node of the first RAT. Further, the network node provides the obtained information set to one or more nodes so that said one or more nodes can use the obtained information set to identify the network nodes of the first RAT that are at least potentially neighboring each other.

According to a fifth aspect of embodiments herein, the object is achieved by a computer program comprising instructions that when executed by a network node causes the network node to perform the method according to the fourth aspect.

According to an sixth aspect of embodiments herein, the object is achieved by a carrier comprising the computer program according to the fifth aspect.

According to an seventh aspect of embodiments herein, the object is achieved by a method, performed by a communication device, for supporting identification of network nodes of a first RAT and of a wireless communication network, which network nodes are at least potentially neighboring each other. The communication device supports both the first RAT and another, second RAT. The communication device receives, from a network node of the first RAT, a request requesting the communication device to provide information that identifies one or more network nodes of the second RAT that are identifiable by the communication device from downlink radio signals transmitted by said network nodes of the second RAT. The communication device identifies, in response to the received request, one or more network nodes of the second RAT from downlink radio signals transmitted by said one or more network nodes of the second RAT. Further, the communication device sends, to the network node of the first RAT in response to the received request, the requested information identifying the identified one or more network nodes of the second RAT.

According to an eight aspect of embodiments herein, the object is achieved by a computer program comprising instructions that when executed by an communication device causes the communication device to perform the method according to the seventh aspect.

According to a ninth aspect of embodiments herein, the object is achieved by a carrier comprising the computer program according to the eighth aspect.

According to a tenth aspect of embodiments herein, the object is achieved by an arrangement for identifying network nodes of a first RAT and of a wireless communication network, which network nodes are at least potentially neighboring each other. Said arrangement is configured to obtain multiple information sets associated with multiple communication devices, respectively, wherein each communication device supports both the first RAT and another, second RAT. Each information set, thus associated with a communication device, identifies a network node of the first RAT, and one or more network nodes of the second RAT that have been identified by the communication device when the communication device was associated with a communicative connection to said identified network node of the first RAT. The arrangement is further configured to identify, based on the obtained multiple information sets, the network nodes of the first RAT that are at least potentially neighboring each other.

According to an eleventh aspect of embodiments herein, the object is achieved by a network node of a first RAT and of a wireless communication network, for supporting identification of network nodes of the first RAT that are at least potentially neighboring each other. The network node is configured to obtain an information set associated with a communication device supporting both the first RAT and another, second RAT. The information set identifies said network node of the first RAT, and one or more network nodes of the second RAT that have been identified by the communication device when the communication device was associated with a communicative connection to said identified network node of the first RAT. The network node provides the obtained information set to one or more nodes so that said one or more nodes can use the obtained information set to identify the network nodes of the first RAT that are at least potentially neighboring each other.

According to a twelfth aspect of embodiments herein, the object is achieved by a communication device for supporting identification of network nodes of a first RAT and of a wireless communication network, which network nodes are at least potentially neighboring each other. The communication device supports both the first RAT and another, second RAT. The communication device is configured to receive, from a network node of the first RAT, a request requesting the communication device to provide information that identifies one or more network nodes of the second RAT that are identifiable by the communication device from downlink radio signals transmitted by said network nodes of the second RAT. The communication device then identifies, in response to the received request, one or more network nodes of the second RAT from downlink radio signals transmitted by said one or more network nodes. Further, the communication device sends, to the network node of the first RAT in response to the received request, the requested information identifying the identified one or more network nodes of the second RAT.

The information sets with said information relating to the first RAT, e.g. NR or 5G, and the second RAT, e.g. LTE, enables identification of nodes of the first RAT that are at least potentially neighbouring each other and thereby it is provided support for establishing neighbour node relations of the first RAT. For example, multiple information sets may be provided that are associated with different network nodes of the first RAT, respectively, but each identifying one or more network nodes of the second RAT that are the same, which thus means that said network nodes of the first RAT are sufficiently close to the same one or more network nodes of the second RAT for a communication device to hear them, or in other words, are in some proximity of the same one or more network nodes of the second RAT and are therefore at least potentially neighbours.

It is realized that the downlink radio signals of the second RAT, e.g. LTE of an existing network, may be reference signals of the second RAT, thereby reducing the need for specific reference signals of the first RAT for this purpose. At the same time the solution does not require any advanced or complex OAM planning tool since said information sets contain information that enables to narrow down to a reduced amount of possible and potential neighbors.

Hence, in view of the above, improvements with regard to establishing neighbour node relations in a wireless communication network have been provided

BRIEF DESCRIPTION OF THE DRAWINGS

Examples of embodiments herein are described in more detail with reference to the appended schematic drawings, which are briefly described in the following.

FIGS. 10*a-c* are schematic drawings illustrating embodiments relating to computer program products and computer programs to cause the arrangement and/or the network node and/or the communication device to perform the first method and/or second method and/or the third method, respectively.

DETAILED DESCRIPTION

Figure 1:
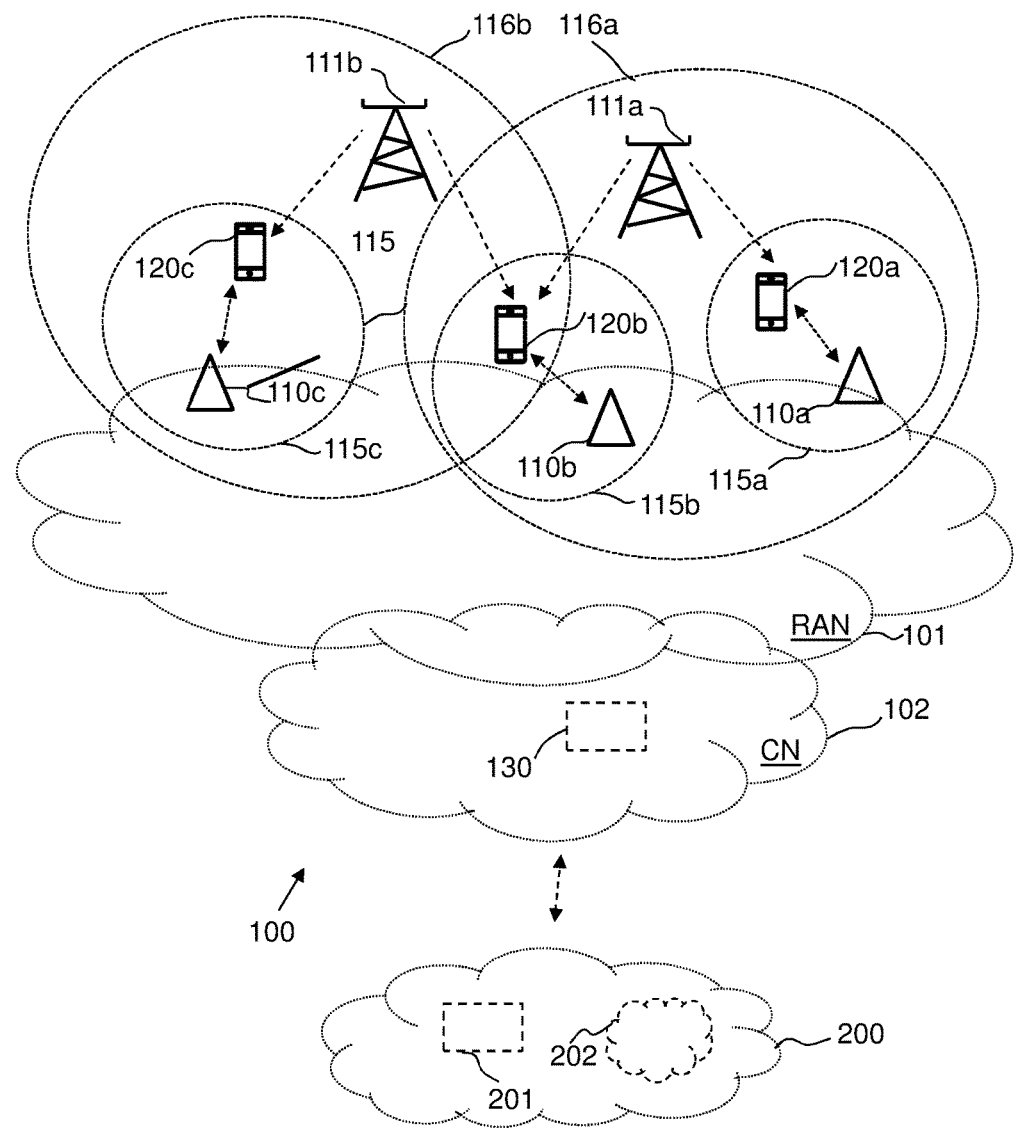
FIG. 1 is a block diagram schematically depicting an example of a wireless communication network relevant for embodiments herein.

Throughout the following description similar reference numerals may be used to denote similar elements, units, modules, circuits, nodes, parts, items or features, when applicable. Features that appear only in some embodiments of what is shown in a figure, are typically indicated by dashed lines in the drawings.

In the following, embodiments herein are illustrated by exemplary embodiments. It should be noted that these embodiments are not necessary mutually exclusive. Components from one embodiment may be tacitly assumed to be present in another embodiment and it will be obvious to a person skilled in the art how those components may be used in the other exemplary embodiments.

It has been realized that 5G based wireless communication networks will most likely be introduced by the operators amongst their existing networks, e.g. LTE (4G), to begin with. In this way, an operator can potentially distribute their CAPital EXpenditures (CAPEX) over time and gradually shift their network to the new radio access technology.

However, when 5G nodes are introduced in an existing network, it has further been realized that the 5G nodes either a) needs to be directly configured by a Operation Administration and Maintenance (OAM) system in use or b) needs to transmit additional system/node information related reference signals, in order to establish base station relations as described above. In the former case, i.e. in the case of OAM based planning, the planning tool needs to be very advanced and/or complex in order to e.g. consider the beam forming capabilities of 5G nodes, the propagation environments of their deployment etc. In the latter case, i.e. additional system/node information reference signal transmission, the above mentioned ultra-lean design principle of 5G is negatively affected.

Hence, at least for 5G, it is desirable with a method for establishing these neighbour relations, which can be as automated as possible but that still keeps any new reference signal transmissions needed to a minimum.

Embodiments herein may be considered to be based on utilization of the likely scenario mentioned above, where operators install 5G nodes and thus will support a 5G RAT in the presence of an existing RAT, such as LTE, that is using "always on" signaling to a greater extent than desirable for 5G. With two RATs available and in use at the same time and there will likely also be wireless communication devices that support both RATs. Such dual RAT communication devices may be utilized, where e.g. a dual RAT communication device being served by a 5G radio node may be controlled to receive reference signals from and identifying audible LTE radio network nodes. Information from dual RAT communication devices served by different 5G radio network nodes but that hear the same LTE radio nodes can then be used for identifying 5G radio network nodes that are potentially neighboring each other, or in other words to provide a coarse identification that facilitates further and more exact identification of neighboring 5G radio network nodes and establishing neighbor node and/or beam relations for these 5G radio network nodes. Always on signaling from another, the second, RAT, such as already provided by LTE, may thus utilized by embodiments herein in order to reduce the need for such signaling in the first RAT, e.g. 5G. The coarse identification provides a starting point that makes later more exact identification less complex and faster. Hence, even if such more exact identification may need some specific reference signals, at least temporary, this can be to a lesser extent thanks to embodiments herein.

FIG. 1 is a schematic block diagram schematically depicting an example of a wireless communication network 100 that is relevant for embodiments herein and in which embodiments herein may be implemented. The wireless communication network 100 may comprise a Radio Access Network (RAN) 101 part and a core network (CN) 102 part. The wireless communication network 100 is typically a telecommunication network or system, such as a cellular communication network that supports a first RAT, e.g. 5G, and a second RAT that may be a LTE or a LTE based wireless communication network. Note that the first and second RAT may be RATs of one and he same wireless communication network as in the shown example, but may alternatively be of different wireless communication networks and/or of different RANs that may share one or more core network nodes and/or management nodes. The second RAT may be a conventional RAT, e.g. LTE, that is based on "always on" downlink signaling, i.e. downlink signals that are broadcasted continuously or at least very frequently and independently on if there is any communication device present or not for receiving the downlink signals. The "always on" downlink signaling typically comprises downlink reference signals identifying nodes and/or cells transmitting them so that a communication device thereby can identify, measure on and possibly connect to these nodes and/or cells. As already indicated, the first RAT may be a next generation, e.g. 5G, RAT, and may be based on a so called "lean design", where such always on signaling as described above is not used or present, or at least desirable to keep to a minimum.

The wireless communication network 100 comprises network nodes that are communicatively interconnected. The network nodes may be logical and/or physical and are located in one or more physical devices. The network nodes may be associated with the first RAT and/or the second RAT. For example, the wireless communication network 100 comprises first RAT network nodes 110*a-c* i.e. network nodes associated with the first RAT, e.g. 5G, such as radio network nodes that may be or comprise a radio transmitting network nodes, such as a base stations, and/or be or comprise controlling nodes, which may control one or more radio transmitting network nodes. The wireless communication network 100 of the example also comprises second RAT network nodes 111*a-b* i.e. network nodes associated with the second RAT, e.g. LTE, such as radio network nodes, that may be or comprise radio transmitting network nodes, such as base stations, e.g. eNBs, and/or be or comprise a controlling radio node, which may control one or more radio transmitting network nodes.

The wireless communication network 100, or specifically one or more network nodes thereof, e.g. the first RAT network nodes 110a-c and the second network nodes 111a-b, is typically configured to serve and/or control and/or manage one or more communication devices, such as communication devices 120a-c, in radio coverage areas, i.e. an area where radio coverage is provided for communication with one or more communication devices. The communication devices 120a-c support both the first and second RATs and may be named dual RAT communication devices. Each radio coverage may be provided by and/or associated with a particular RAT, e.g. the first RAT or the second RAT. The radio coverage may be radio coverage of a cell, of a radio beam, typically named only beam, or of a set or group of radio beams. The set or group may be radio beams that are transmitting identical identifiers, e.g. all radio beams provided by a one or more network nodes that transmit the same identifier, or in other words that have a common identifier. As should be recognized by the skilled person, a so called beam is a more dynamic and relatively narrow and directional radio coverage compared to a conventional cell, and is typically accomplished by so called beamforming. A beam is typically for serving one or a few communication devices at the same time, and may be specifically set up for serving this one or few communication devices. The beam may be changed dynamically by beamforming to provide desirable coverage for the one or more communication devices being served by the beam. Similar to a cell, a beam is typically associated with a beam identity, that may be transmitted by the beam, and that in turn is typically, directly or indirectly, also identifying the network node providing the beam. Similarly, such identifier mentioned above that is the same for the set or group of beams, may directly or indirectly identify the beams of the set or group, e.g. by their beam identities, and similarly also identify the network node, or nodes, providing said set or group of beams.

In the shown example there are first RAT radio coverage areas 115a-c that may correspond to radio beams provided by the first RAT network nodes 110a-c, and there are second RAT coverage areas 116a-b that may correspond to cells, e.g. LTE cells, provided by the second RAT network nodes 111a-b. Although not shown in the example, it should be noted that there may be more than one radio coverage area provided by each network node.

In the figure, and in a exemplifying scenario:

The communication device 110a is located in first RAT coverage area 115a and in the second RAT coverage area 116a. The communication device 110a may thus e.g. communicate with, such as be served, in the first RAT coverage area 115a, e.g. a 5G radio beam, provided by the first RAT network node 110a and be able to receive downlink signals in the second RAT coverage area 116a, e.g. a LTE cell, provided by the second RAT network node 111a.

The communication device 110b is located in first RAT coverage area 115b, in the second RAT coverage area 116a and in the second RAT coverage area 116b. The communication device 110b may thus e.g. communicate with, such as be served, in the first RAT coverage area 115b, e.g. a 5G or NR radio beam, provided by the first RAT network node 110b and be able to receive downlink signals in both the second RAT coverage area 116a and the second RAT coverage area 116b, e.g. LTE cells, provided by the second RAT network node 111a and the second RAT network node 111b, respectively.

The communication device 110c is located in first RAT coverage area 115c and in the second RAT coverage area 116b. The communication device 110c may thus e.g. communicate with, such as be served, in the first RAT coverage area 115c, e.g. a 5G radio beam, provided by the first RAT network node 110c and be able to receive downlink signals in the second RAT coverage area 116b, e.g. a LTE cell, provided by the second RAT network node 111b.

The communication devices may e.g. be named wireless communication devices, or simply wireless devices, and are thus supported by and/or operative in the wireless communication network 100. It should be understood by the person skilled in the art that "communication device" may include e.g. any wireless terminal, User Equipment (UE), Machine Type Communication (MTC) device, Device to Device (D2D) terminal, or node, e.g. smartphone, laptop, mobile, sensor, relay, mobile tablets or even a base stations, e.g. a small and/or special kind of base station, that e.g. may be for communication within a radio coverage area.

Further, the wireless communication network 100 may comprise one or more central nodes, e.g. a central node 130, i.e. a network node that is common or central and communicatively connected to multiple other nodes, e.g. multiple radio network nodes, and may be for managing and/or controlling these nodes. The central node 130 may be an OAM node. The one or more central nodes may be comprised in the CN 102, and may thus be or comprise one or more core network nodes, and/or may e.g. be one or more internal management nodes of the wireless communication network 100.

The wireless communication network, e.g. the CN 102, may further be communicatively connected to, and thereby e.g. provide access for said communication devices, to an external network 200, e.g. the Internet. The communication devices 120a-c may thus communicate via the wireless communication network 100, with the external network 200, or rather with one or more other devices, e.g. servers and/or other communication devices connected to other wireless communication networks, and that are connected with access to the external network 200.

Moreover, there may be one or more external nodes, e.g. an external node 201, for communication with the wireless communication network 100 and node(s) thereof. The external node 201 may e.g. be an external management node. Such external node may be comprised in the external network 200 or may be separate from this.

Furthermore, the one or more external nodes may correspond to or be comprised in a so called computer, or computing, cloud, that also may be referred to as a cloud system of servers or computers, or simply be named a cloud, such as a computer cloud 202 as shown in the figure, for providing certain service(s) to outside the cloud via a communication interface. The exact configuration of nodes etc. comprised in the cloud in order to provide said service (s) may not be known outside the cloud. The name "cloud" is often explained as a metaphor relating to that the actual device(s) or network element(s) providing the services are typically invisible for a user of the provided service(s), such as if obscured by a cloud. The computer cloud 202, or typically rather one or more nodes thereof, may be communicatively connected to the wireless communication network 100, or certain nodes thereof, and may be providing one or more services that e.g. may provide, or facilitate, certain functions or functionality of the wireless communication network 100. The computer cloud 202 may be comprised in the external network 200 or may be separate from this.

Figure 2:
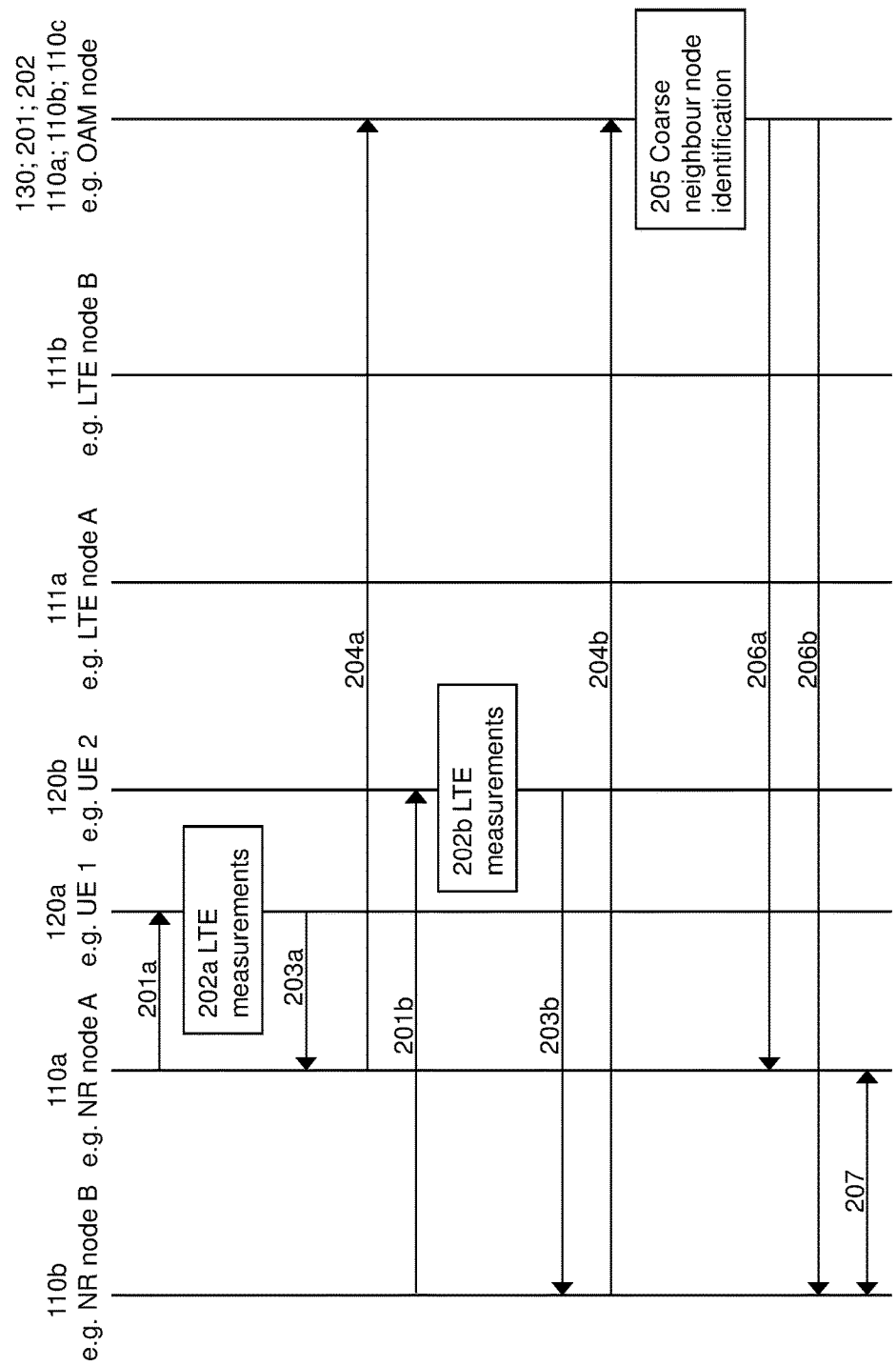
FIG. 2 is a first combined signaling diagram and flowchart for describing some embodiments herein in an exemplary scenario.

FIG. 2 depicts a combined signaling diagram and flowchart, which will be used to discuss embodiments herein in an exemplary scenario where next generation (NX) nodes, e.g. 5G nodes or New Radio (NR) nodes, are to be established in a previous generation, here LTE, network. In this scenario the first RAT network node 110a is exemplified by an NR node A and the first RAT network node 110b is exemplified by an NR node B. The second RAT network node 111a is exemplified by an LTE node A and the second RAT network node 111b is exemplified by an LTE node B. The communication devices 120a is named UE 1 and the communication device 120b is named UE 2, i.e. using the LTE naming of communication devices. In the scenario, the two LTE nodes, LTE node A and LTE node B, transmit their node and system information continuously as conventionally according to the 3GPP standard. The two NR nodes, NR node A and NR node B are deployed in the coverage area of the two LTE nodes. Note that not all but rather only those NR beams which are serving a UE may be activated by the NR nodes. It is assumed that UE 1 and UE 2 are communicatively connected to NR nodes, and thus may be considered to be served by these nodes, respectively, and that these UEs are capable of measuring on the LTE network as well, i.e. they are dual-RAT, here NR and LTE, capable.

The figure also shows a node named OAM network node, e.g. for processing and storage, as further discussed below, and may e.g., correspond to the central node 130, the external node 201 or the computer cloud 202, as indicated in the figure, but it may in principle correspond to any node; a dedicated node or a node with another purpose that also implement the functionality of this node as described below, e.g. be any of the NR nodes A-C or the LTE nodes A-B. Thus this node may correspond to one or more of the first RAT network nodes 110a-c, and/or second RAT network nodes 111a-b. However, in practice it may be beneficial that this is a node that is separate from the NR nodes A-C, but accessible by these nodes, e.g., as indicated in the figure, a specific OAM node that may correspond to the central node 130.

In the figure, the sub-index a, b and c for some of the actions are used to indicate the same kind of action but for a different node(s). The actions below may be taken in any suitable order and/or be carried out fully or partly overlapping in time when this is possible and suitable.

Actions 201a, 201b

The NR node A, serving UE 1, configures the UE 1 to send back a measurement report related to audible LTE cells and their signal strength in terms of RSRP. The configuration may be carried out by sending a signal or message to UE 1, which message, requests, e.g. instructs or commands, UE 1 to send back the measurement report with the signal strength of the audible cells.

Action 201b corresponds to 201a a but is instead between and relates to NR node B and UE 2.

Actions 202a, 202b

In action 202a, in response to the configuration in the foregoing action 201a, the UE 1 carries out measurements on the LTE nodes, typically on LTE cells provided by these nodes, that it can hear, i.e. that are audible, which in the shown example scenario may be LTE node A.

Action 202b corresponds to action 202a but is for UE 2 that may hear LTE node A and/or LTE node B.

Actions 203a, 203b

In action 203a, data from measurements related to the heard LTE nodes or cells are sent, or in other words reported, from UE 1 to NR node A.

A report with the data may comprise, but need not be restricted to, identifiers of the heard, i.e. audible, LTE nodes, such as cells, and may comprise one or more of the following: Physical Cell Identities (PCI), Cell Global Identities (CGI), and an indication of the signal strength, such as Reference Signal Received Power (RSRP), of the LTE nodes.

Action 203b corresponds to action 203a but is between UE 2 and NR node B.

Actions 204a, 204b

In action 204a, NR node A sends data from the measurements obtained from UE 1 in Action 203a, to the OAM network node, i.e. to another node for further processing and/or storage.

Action 204b corresponds to action 204a but is between NR node B and the OAM network node.

In the present example, the OAM network node thus receives data from measurements, e.g. in the form of two different measurement reports, from NR Node A, based on measurements by UE 1 on LTE node A, and from NR node B, based on measurements by UE 2 on LTE node A and/or on LTE node B.

Action 205

The OAM network node identifies potentially, i.e. relevant, neighboring nodes for the NR nodes that have sent the data from measurements, such as sent in actions 204a-b. Processing to accomplish identification uses the received data, e.g. the received measurement reports, from these NR nodes. In the present example, the OAM network node thus identifies potentially neighboring NR nodes to NR node A and to NR node B. NR nodes may identified as potentially neighboring each other if the NR nodes that sent the data, e.g. measurement reports, to the OAM network node, identifies one or more of the same audible LTE nodes, or cells, in the data, i.e. that one or more of the same LTE nodes have been heard. The more LTE nodes that are the same may indicate a greater probability that the NR nodes are actually neighboring.

Additionally, for LTE nodes that are the same, the audibility level, e.g. RSRP, may also be taken into account, e.g. by only taking into account a LTE node if the audibility level, e.g. a RSRP value, is above a pre-defined threshold, and/or the audibility may be used so that LTE nodes that are the same and have similar, and/or relatively high audibility level, are considered to have a greater probability to be neighboring.

It is realized that information as above regarding potentially neighboring NR nodes is a useful starting point for further investigations to find more exact neighboring node relations.

The identification of the potentially neighboring nodes and generation of a coarse neighbor list is further and separately discussed below.

Actions 206a, 206b

In action 206a, the OAM network node informs the NR node A about the identified potentially neighboring nodes identified in action 205, e.g. sends a coarse neighboring node list that contains information about the potentially neighboring nodes of NR node A.

Action 206b corresponds to action 204a but is between the OAM network node and NR node B.

Action 207

Upon receiving the coarse neighbor list from the OAM/network node, the NR nodes, i.e., in the scenario according to the figure, NR node A and NR node B, may initiate a measurement campaign amongst the members of such a list, i.e. towards potential neighbors. For example, if it is assumed that it is identified that NR node A and NR node B are potential neighbors, any of these, or both nodes may initiate a measurement campaign towards the other to find out if they really are neighbors. In case of excessive neighboring nodes, that is, if there is no indication that they actually are neighbors, these may be removed, such as in a case when there is no indication of any handover or mobility actually being performed between these nodes. Hence, even if there first is a coarse list with many potentially neighboring network nodes, there may, in the end, be a list of only actually neighboring network nodes.

To sum up, the actions discussed above could be briefly summarized as that a NR node may configure one or more UEs that it serves to measure on LTE cells that the UE can hear, and report back the results. The NR node may then provide data from the measurements to a OAM network node. The OAM network node may then use data from these measurements along with similar data obtained currently and/or in the past from other NR nodes, and identify NR nodes that are potentially neighboring each other, and e.g. generate a coarse neighbor list for each involved NR node. The coarse neighbor lists may then be sent to the NR nodes, which in turn then can initiate a further detailed measurement campaign towards the NR nodes in the coarse neighbor list, i.e. those indicated as potential neighbors, in order to identify more exact or actual neighbor node relations, and possibly also beam-to-beam relations.

It will now be further discussed the coarse neighbor list with potentially neighboring NR nodes and how it can be accomplished.

Figure 3:
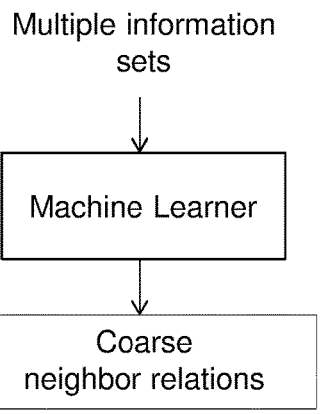
FIG. 3 is a simple flowchart schematically illustrating an example how a machine learner can be used with some embodiments.

FIG. 3 is a simple flowchart schematically illustrating how information sets, e.g. with data from measurements, such as in the form of two measurement reports, e.g. from NR nodes such as in actions 204a-b discussed above, can be fed to a machine learner, typically based on one or more algorithms, to generate coarse neighboring node relations, e.g. a list, and thereby identify NR nodes that are potentially neighboring each other. Each information set, e.g. measurement report, may in addition to measurement data contain identifiers identifying the one or more LTE nodes or cells being heard and the NR node and/or beam serving the UE when it was hearing these LTE nodes or cells. The output may thus be a list or lists with coarse neighbor node relations for one or more NR nodes. The machine learner may operate using hardware, such as memory and processing means, of the node that comprises the machine learner, e.g. the OAM network node.

It is realized that in practice, there would typically be much more NR nodes, LTE nodes and communication devices involved, and also much more data from measurement to handle, than in the simplified scenario discussed above and shown in FIG. 2. The network node comprising the machine learner, e.g. the OAM network node, may thus use data and information obtained from many more NR nodes, the measurement data originating from several communication devices, where each communication device may have provided data at one or more occasions. Machine Learning (ML) techniques may be used, e.g. supervised learning, since both input features, such as LTE nodes and LTE RSRP values, and output label, such 5G/NR beam(s) and/or node(s) serving the UE, and corresponding values, are known and can be used by the machine learner. An ML technique can thus be used to identify a presence of a secondary carrier by using the primary carrier measurements, for example RSRP of the primary carrier.

Table 1 below exemplifies a compilation of data received from NR nodes, e.g. data as received e.g. in actions 204a-b above but here also with additional data, not only data from two LTE measurement occasions as in the scenario of FIG. 2. The table shows data from five LTE measurement occasions, for example; two by one or more UEs served by NR node A, or more particularly by beams identified as A3 and A9 of NR node A, one by a UE served by a NR node C (not shown) or in particular a beam identified as C5 of the NR node C, and two by one or more UEs served by NR node B, or more particularly by beams identified as B4 and B6 of NR node A. As indicated in the table, the table may contain data from even more measurements.

TABLE 1

| Serving NR node by beam identifier | Audible LTE cells | Respective RSRP values of LTE cells |
| --- | --- | --- |
| A3 | LTE-A | −110 dBm |
| A9 | LTE-A, LTE-B | {−80, −92} dBm |
| C5 | LTE-A | −114 dBm |
| B4 | LTE-A, LTE-B | {−83, −92} dBm |
| B6 | LTE-A, LTE-B | {−88, −89} dBm |
| . . . | .. | .. |

If data as in the table would be fed to a machine learner operating as indicated above, the machine learner may output the following initial coarse neighbor relations.
1) Node A and Node C are potential neighbors
2) Node A and Node B are potential neighbors A solution as disclosed herein may be beneficial to use in a scenario where new NR nodes are introduced into an existing LTE network. Above it has been referred to LTE as a RAT in an existing network operated by an operator, but this can as should be realized be generalized and the solution be operable with in principle any other current or future RAT.

Advantages enabled by the solution e.g., include:
1) A NR node may establish neighbor relations without using a complicated planning tool that would have to be pre-configured with an exhausting list of possible NR neighbors. A procedure as described above, and that easily can be automated, alleviates the need for such complex OAM based planning.
2) A newly deployed NR node may, thanks to the solution herein, start in an ultra-lean transmission mode and only start transmitting more reference signals once a measurement campaign amongst the identified potential neighbors, e.g. according to a coarse neighbor list. Such measurement campaign may is activated by the solution presented herein, e.g. upon receipt as in action 207. Basically, the solution herein and identification of potential neighboring nodes, may act as a trigger method for a further measurement campaign or campaigns to determine actually neighboring noses, or in other words to establish actual neighbor node relations and/or beam relations. Thanks to embodiments herein, NR reference signal transmissions can be reduced or even be kept to a minimum.

Figure 4:
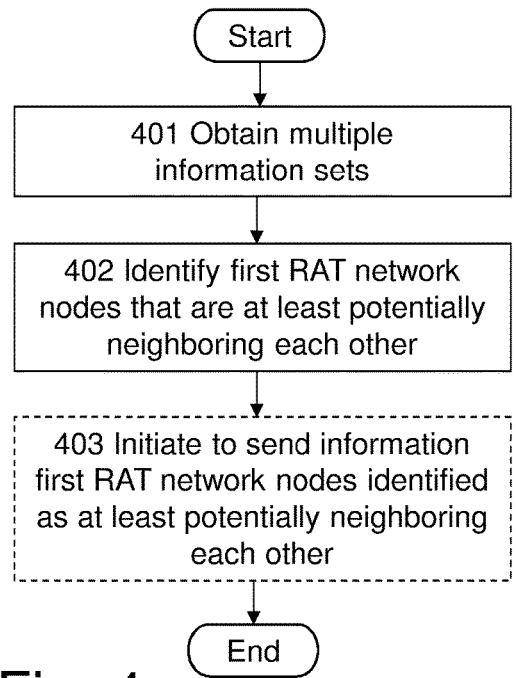
FIG. 4 is a flowchart schematically illustrating embodiments of a first method according to embodiments herein.

FIG. 4 is a flow chart schematically illustrating embodiments of a first method, for identifying network nodes of a first RAT, e.g. the first RAT network nodes 110a-c, and of a wireless communication network, e.g. the wireless communication network 100, which network nodes are at least potentially neighboring each other.

The first method may be performed by the wireless communication network 100 or one or more nodes thereof, e.g. by any one of the first RAT network nodes 110a-c or the central node 130. Alternatively the first method may be performed by one or more external nodes, e.g. the external node 201 or the computer cloud 202.

The first method comprises the following actions, which actions may be taken in any suitable order and/or be carried out fully or partly overlapping in time when this is possible and suitable.

Action 401

Multiple information sets associated with multiple communication devices, respectively, e.g. with the communication devices 120a-c, are obtained. Each communication device supporting both the first RAT and another, second RAT. Each information set, thus associated with a communication device, e.g. an information set associated with the communication device 120a, identifies:

a network node of the first RAT, e.g. the first RAT network node 110a, and one or more network nodes of the second RAT, e.g. the second RAT network node 111a, that have been identified by the communication device 120a when the communication device 120a was associated with a communicative connection to said identified first RAT network node 110a.

As used herein, by a communication device supporting both a first RAT and a second RAT is meant that a communication device is operable in both the first and the second RAT, although not necessary at the same time. For example, the communication device may be able to, e.g. temporarily, use, such as switch from the first RAT to, the second RAT, e.g. when the second RAT is present, e.g. in order to save energy and/or for communicating data, e.g. in order to access or use certain communication ability, such as other kind of radio and/or data access than accessible through the first RAT.

A communication device is e.g. associated with a communicative connection to a network node when it is being served by the network node, e.g. served in a cell or beam provided by the network node.

Note that although an information set is associated with a communication device, e.g. by being at least partly provided by a communication device, the communication device need not be identified by the information set. Also note that one and the same communication device can be associated with multiple information sets The one or more network nodes of the second RAT, e.g. the second RAT network node 111a, may have been be identified by the communication device 120a from downlink radio signals transmitted by said second RAT network node 111a.

Each information set associated with a communication device may also comprise measurement data from measurements made by the communication device 120a on said downlink radio signals.

The multiple information sets may e.g. be obtained internally and/or by being received from one or more of the network nodes of the first RAT, e.g. from one or more of the first RAT network nodes 110a-c. They may be received directly from these nodes or via one or more other nodes. For example, if the first method is carried out by the central node 130, such as an OAM node, it may obtain the multiple information sets by receiving them from the first RAT network nodes 110a-c. Each first RAT network node may provide one or more information sets. If the first method is carried out by an external node, e.g. the external node 201 or the computer cloud 202, the central node 130, e.g. a OAM node, may first receive the information sets from the first RAT network nodes 110a-c and then forward them to the external node.

This action may fully or partly correspond to actions 204a-b as described above.

Action 402

Network nodes of the first RAT that are at least potentially neighboring each other , e.g. the first RAT network node 110a and the first RAT network node 110b, are identified based on the obtained multiple information sets.

The identification that the first RAT network node 110a and the first RAT network node 110b are potentially neighboring each other may be based on that the information sets identifying these first RAT network nodes are identifying the same one or more network nodes of the second RAT, e.g. of the second RAT network node 111a.

Alternatively, identification that the first RAT network node 110a and the first RAT network node 110b are potentially neighboring each other may be based on that the information sets identifying these first RAT network nodes are identifying the same one or more network nodes of the second RAT, e.g. of the second RAT network 111a, and for which one or more network nodes of the second RAT, e.g. the second RAT network node 111a, the measurement data indicate a sufficient signal audibility according to a predefined criteria.

This action may fully or partly correspond to action 205 as described above.

Action 403

Information about the network nodes of the first RAT identified as at least potentially neighboring each other, e.g. the first RAT network node 110a and the first RAT network node 110b, may be initiated to be sent to at least one of these network nodes of the first RAT, typically to each one of the network nodes of the first RAT identified as at least potentially neighboring each other, i.e. in the present example to the first RAT network node 110a and the first RAT network node 110b.

In case the first method is carried out by a node comprised in the wireless communication network 100, e.g. the central node 130, such as an OAM node, the node may itself both initiate to send and send the information. However, in case the method e.g. is performed by an external node, e.g. the external node 201 or the computer cloud 202, e.g. as part of supporting the wireless network 100, e.g. the central node 130, such as a OAM node, with functionality corresponding to the first method, then the external node may itself not send the information, but e.g. initiate this by making the central node send the information. The initiation to send may thus e.g. be accomplished by triggering another node to send the information.

This action may fully or partly correspond to action 205 as described above.

Figure 5:
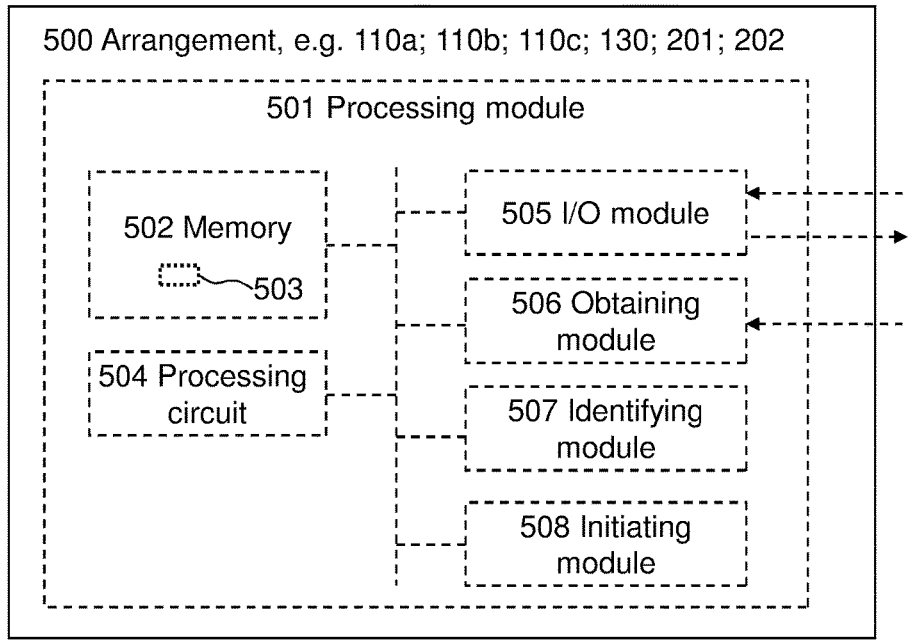
FIG. 5 is a functional block diagram for illustrating embodiments of an arrangement according to embodiments herein and how it can be configured to carry out the first method.

FIG. 5 is a schematic block diagram for illustrating embodiments of how a arrangement 500 may be configured to perform the first method and actions discussed above in connection with FIG. 4. As already indicated above, the arrangement 500 may be the central node 130, e.g. an OAM node, or may in principle be any node of the wireless communication network 100, e.g. any one of the first RAT network nodes 110a-c, or e.g. an external node, such as the external node 201 or the computer cloud 202.

Hence, the arrangement 500 is for identifying network nodes of the first RAT and of the wireless communication network 100, e.g. among the first RAT network nodes 110a-c, which network nodes 110a-c are at least potentially neighboring each other.

The arrangement 500 may comprise a processing module 501, such as a means, one or more hardware modules, including e.g. one or more processors, and/or one or more software modules for performing said methods and/or actions.

The arrangement 500 may further comprise a memory 502 that may comprise, such as contain or store, a computer program 503. The computer program 503 comprises 'instructions' or 'code' directly or indirectly executable by the arrangement 500 so that it performs said methods and/or actions. The memory 502 may comprise one or more memory units and may further be arranged to store data, such as configurations and/or applications involved in or for performing functions and actions of embodiments herein.

Moreover, the arrangement 500 may comprise a processing circuit 504 as an exemplifying hardware module and may comprise or correspond to one or more processors. In some embodiments, the processing module 501 may comprise, e.g. 'is embodied in the form of' or 'realized by' the processing circuit 504. In these embodiments, the memory 502 may comprise the computer program 503 executable by the processing circuit 504, whereby the arrangement 500 is operative, or configured, to perform said first method and/or actions.

Typically the arrangement 500, e.g. the processing module 501, comprises an Input/Output (I/O) module 505, configured to be involved in, e.g. by performing, any communication to and/or from other units and/or nodes, such as sending and/or receiving information to and/or from other nodes or devices. The I/O module 505 may be exemplified by an obtaining, e.g. receiving, module and/or a providing, e.g. sending, module, when applicable.

Further, in some embodiments, the arrangement 500, e.g. the processing module 501, comprises one or more of an obtaining module 506, an identifying module 507 and an initiating module 508, as exemplifying hardware and/or software module(s). These modules may be fully or partly implemented by the processing circuit 504.

The arrangement 500, and/or the processing module 501, and/or the processing circuit 504, and/or the I/O module 505, and/or the obtaining module 506 are operative, or configured, to obtain said multiple information sets, for example configured to receive them from one or more of the network nodes of the first RAT.

Moreover, the arrangement 500, and/or the processing module 501, and/or the processing circuit 504, and/or the identifying module 507, are operative, or configured, to identify, based on the obtained multiple information sets, said network nodes of the first RAT that are at least potentially neighboring each other.

Further, the arrangement 500, and/or the processing module 501, and/or the processing circuit 504, and/or the I/O module 505, and/or the initiating module 508 may be operative, or configured, to initiate to send, or send, to said at least one of the network nodes of the first RAT, the information about the network nodes of the first RAT identified as at least potentially neighboring each other.

Figure 6:
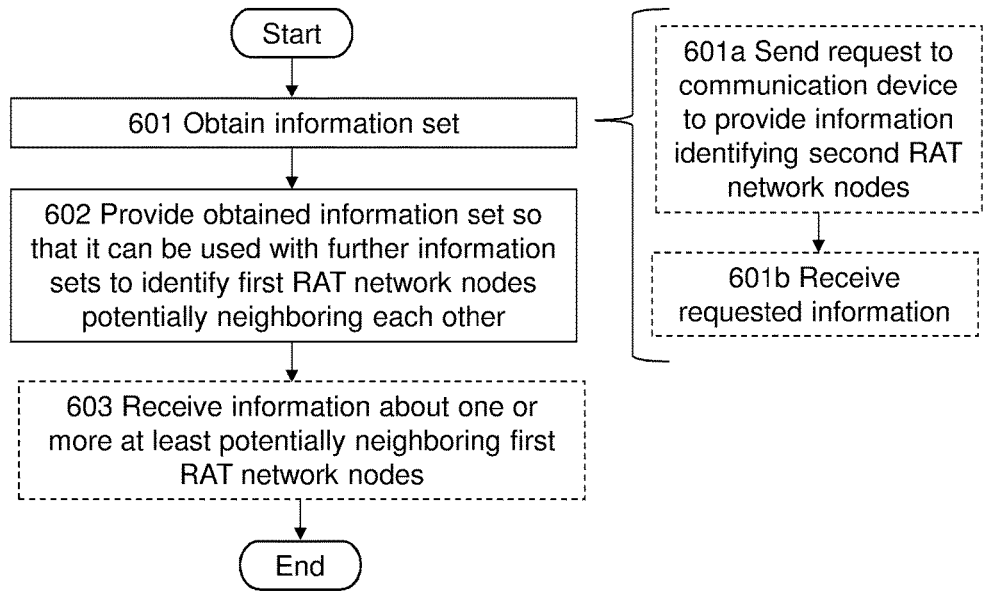
FIG. 6 is a flowchart schematically illustrating embodiments of a second method according to embodiments herein.

FIG. 6 is a flow chart schematically illustrating embodiments of a second method, performed by a network node of a first RAT, e.g. the first RAT network node 110a, for supporting identification of network nodes of the first RAT, e.g. the first RAT network nodes 110a-c, and of a wireless communication network, e.g. the wireless communication network 100, which network nodes are at least potentially neighboring each other.

The second method comprises the following actions, which actions may be taken in any suitable order and/or be carried out fully or partly overlapping in time when this is possible and suitable.

Action 601

The first RAT network node 110a obtains an information set associated with a communication device, e.g. the communication device 110a, supporting both the first RAT and another, second RAT. The information set identifies:

said first RAT network node 110a, and one or more network nodes of the second RAT, e.g. the second RAT network node 111a, that have been identified by the communication device 120a when the communication device 120a was associated with a communicative connection to said identified first RAT network node 110a.

The one or more network nodes of the second RAT, e.g. the second RAT network node 111a, may have been be identified by the communication device 120a from downlink radio signals transmitted by said second RAT network node 111a.

The information set may also comprise measurement data from measurements made by the communication device 120a on said downlink radio signals.

The information set may fully or partly be obtained internally and/or be received from the communication device 120a. For example, in the information set, an identity or identifier of the second RAT network node 111 and/or the measurement data, may have been received from the communication device 120a, while an identity or identifier of the first RAT network node 110a may have been be obtained internally.

Note that the first RAT network node 110a may receive further one or more information sets associated with the communication device 120a but at different points in time and/or from other one or more communication devices, that also are dual RAT devices, when such communication devices are associated with a communicative connection to, e.g. served by, the first RAT network node 110a.

This action may fully or partly correspond to actions 201a, 203a as described above.

Action 601a

Action 601 may comprise that the first RAT network node 110a sends, to the communication device 120a, a request requesting the communication device 120a to provide information identifying one or more network nodes of the second RAT that are identifiable by the communication device 120a from downlink radio signals transmitted by said one or more second RAT network nodes, e.g. by the second RAT network nodes 111a-b.

This action may fully or partly correspond to action 201a.

Action 601b

Action 601 may comprise that the first RAT network node 110a receives, from the communication device 120a in response to the sent request in action 601a, the requested information identifying one or more second RAT network nodes that have been identified by the communication device 120a, e.g. the second RAT network node 111a.

This action may fully or partly correspond to action 203a.

Action 602

The first RAT network node 110a provides, e.g. sends, the obtained information set to one or more nodes, so that said one or more nodes can use the obtained information set to identify the first RAT network nodes 110a-c that are at least potentially neighboring each other. Said one or more nodes may carry out the identification by application of the first method discussed above and may thus be one or more of the nodes discussed above for performing the first method. As realized, the one or more nodes thus typically need one or more further information sets from also other first RAT network nodes, e.g. the first RAT network node 110b, to get sufficient information to be able to perform the identification.

This action may fully or partly correspond to actions 204a as described above.

Action 603

The first RAT network node 110a may receive, from at least one of said nodes in response to the provision of the obtained information set in the foregoing action 602, information about one or more network nodes of the first RAT, e.g. the first RAT network node 110b, that have been identified as at least potentially neighboring the network node 110a performing the second method.

This action may fully or partly correspond to actions 206a as described above.

Figure 7:
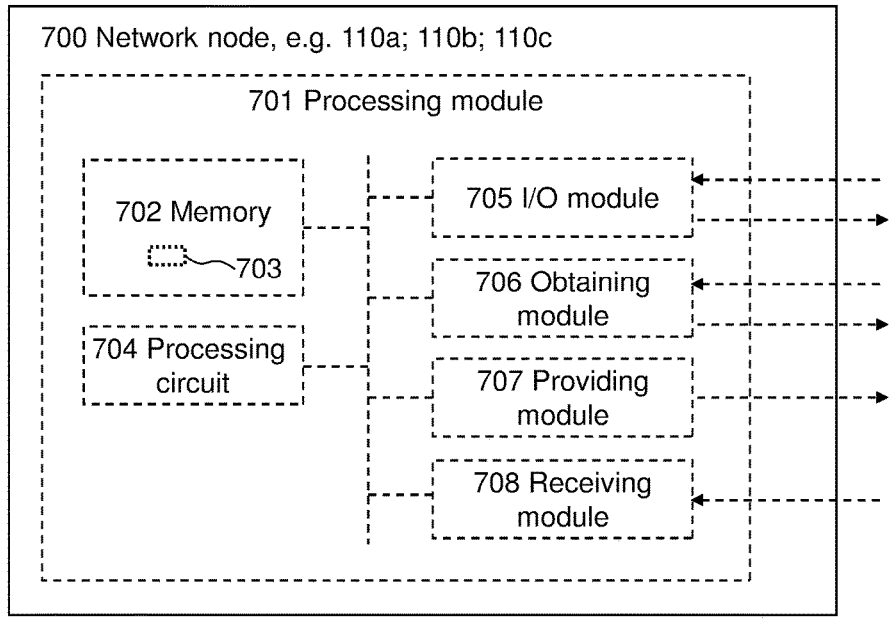
FIG. 7 is a functional block diagram for illustrating embodiments of a network node according to embodiments herein and how it can be configured to carry out the second method.

FIG. 7 is a schematic block diagram for illustrating embodiments of how a network node 700 of the first RAT may be configured to perform the second method and actions discussed above in connection with FIG. 6. As already indicated above, the network node 700 may e.g. any one of the first RAT network node 110a-c, e.g. the first RAT network node 110a as in the example above.

Hence, the network node 700 is for supporting identification of network nodes of the first RAT, e.g. among the first RAT network nodes 110a-c, that are at least potentially neighboring each other.

The network node 700 may comprise a processing module 701, such as a means, one or more hardware modules, including e.g. one or more processors, and/or one or more software modules for performing said methods and/or actions.

The network node 700 may further comprise a memory 702 that may comprise, such as contain or store, a computer program 703. The computer program 703 comprises 'instructions' or 'code' directly or indirectly executable by the network node 700 so that it performs said methods and/or actions. The memory 702 may comprise one or more memory units and may further be arranged to store data, such as configurations and/or applications involved in or for performing functions and actions of embodiments herein.

Moreover, the network node 700 may comprise a processing circuit 704 as an exemplifying hardware module and may comprise or correspond to one or more processors. In some embodiments, the processing module 701 may comprise, e.g. 'is embodied in the form of' or 'realized by' the processing circuit 704. In these embodiments, the memory 702 may comprise the computer program 703 executable by the processing circuit 704, whereby the network node 700 is operative, or configured, to perform said method and/or actions.

Typically the network node 700, e.g. the processing module 701, comprises an Input/Output (I/O) module 705, configured to be involved in, e.g. by performing, any communication to and/or from other units and/or nodes, such as sending and/or receiving information to and/or from other nodes or devices. The I/O module 705 may be exemplified by an obtaining, e.g. receiving, module and/or a providing, e.g. sending, module, when applicable.

Further, in some embodiments, the network node 700, e.g. the processing module 701, comprises one or more of an obtaining module 706, a providing module 707 and a receiving module 708 as exemplifying hardware and/or software module(s). These modules may be fully or partly implemented by the processing circuit 704.

The network node 700, and/or the processing module 701, and/or the processing circuit 704, and/or the I/O module 705, and/or the obtaining module 706 is operative, or configured, to obtain said information set associated with the communication device 120a. In some embodiments, the network node 700, and/or the processing module 701, and/or the processing circuit 704, and/or the I/O module 705, and/or the obtaining module 706 may be further operative, or configured to send, to the communication device 120a, said request requesting the communication device 120a to provide said information identifying the one or more network nodes of the second RAT that are identifiable by the communication device 120a from downlink radio signals transmitted by said one or more network nodes of the second RAT. In these embodiments, the network node 700, and/or the processing module 701, and/or the processing circuit 704, and/or the I/O module 705, and/or the obtaining module 706 may also be further operative, or configured to receive, from the communication device 120a in response to the sent request, the requested information identifying the one or more network nodes of the second RAT, e.g. the second RAT network node 111b, that have been identified by the communication device 120a.

Moreover, the network node 700, and/or the processing module 701, and/or the processing circuit 704, and/or the I/O module 705, and/or the providing module 707, are operative, or configured, to provide the obtained information set to said one or more nodes so that said one or more nodes can use the obtained information set to identify the network nodes of the first RAT that are at least potentially neighboring each other.

Further, the network node 700, and/or the processing module 701, and/or the processing circuit 704, and/or the I/O module 705, and/or the receiving module 708, may be operative, or configured, to receive, from at least one of said nodes in response to the provision of the obtained information set, said information about one or more network nodes of the first RAT, e.g. the first RAT network node 110b, that have been identified as at least potentially neighboring the first RAT network node 110a, i.e. here the network node performing the method.

Figure 8:
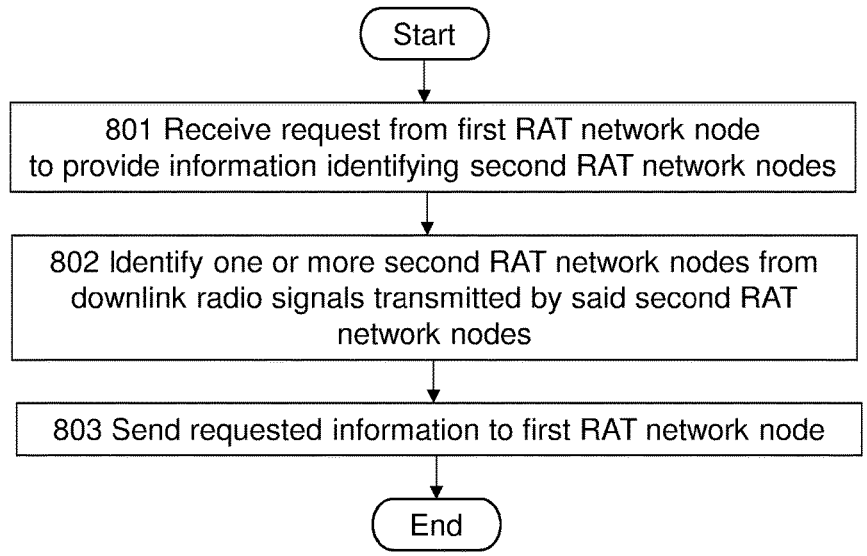
FIG. 8 is a flowchart schematically illustrating embodiments of a third method according to embodiments herein.

FIG. 8 is a flow chart schematically illustrating embodiments of a third method, performed by a communication device, e.g. the communication device 120a, for supporting identification of network nodes of the first RAT, e.g. the first RAT network nodes 110a-c, and of a wireless communication network, e.g. the wireless communication network 100, which network nodes are at least potentially neighboring each other. The communication device 120a is supporting both the first RAT and another, second RAT.

The third method comprises the following actions, which actions may be taken in any suitable order and/or be carried out fully or partly overlapping in time when this is possible and suitable.

Action 801

The communication device 120a receives, from a network node of the first RAT, e.g. the first RAT network node 110a, a request requesting the communication device 120a to provide information that identifies one or more network nodes of the second RAT, e.g. one or more of the second RAT network nodes 111a-b, that are identifiable by the communication device 120a from downlink radio signals transmitted by the second RAT network nodes 111a-b.

The requested information may also comprise measurement data from measurements made by the communication device 120a on said downlink radio signals.

This action may fully or partly correspond to action 201a.

Action 802

The communication device 120a identifies, in response to the received request, one or more network nodes of the second RAT, e.g. the second RAT network node 111a, from downlink radio signals transmitted by said one or more network nodes of the second RAT, e.g. the second RAT network node 111a.

This action may fully or partly correspond to action 202a.

Action 803

The communication device 120a sends, to the first RAT network node 110a in response to the received request, the requested information identifying the identified second RAT network node 111a.

This action may fully or partly correspond to action 203a.

Figure 9:
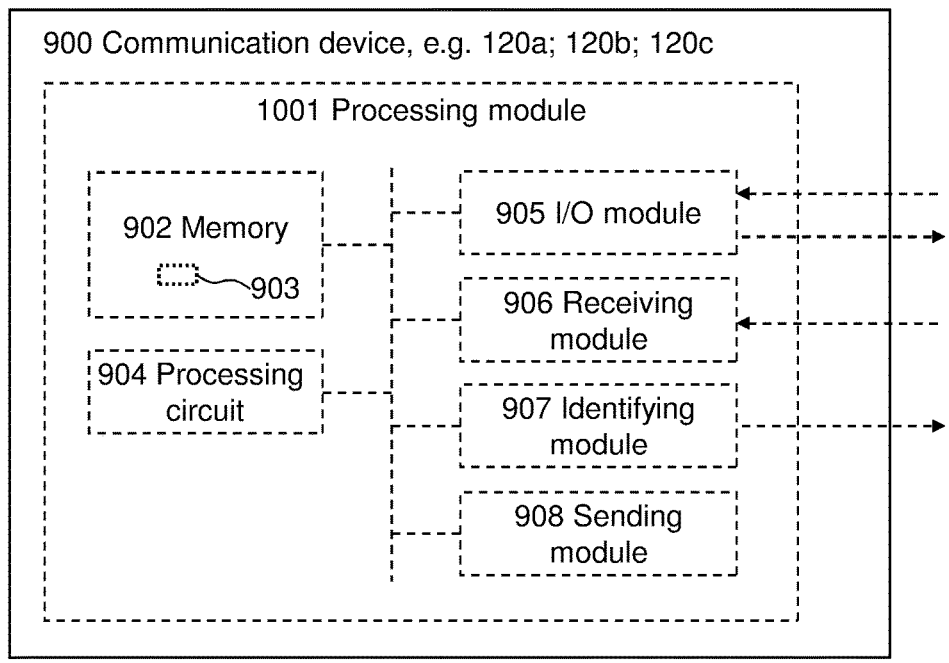
FIG. 9 is a functional block diagram for illustrating embodiments of a communication device according to embodiments herein and how it can be configured to carry out the third method.

FIG. 9 is a schematic block diagram for illustrating embodiments of how a communication device 900 may be configured to perform the third method and actions discussed above in connection with FIG. 8. As already indicated above, the communication device 900 may e.g. any one of the communication devices 120a-c, e.g. the communication device 120a as in the example above.

Hence, the communication device 900 is for supporting identification of network nodes of the first RAT, e.g. among the first RAT network nodes 110a-c, that are at least potentially neighboring each other.

The communication device 900 may comprise a processing module 901, such as a means, one or more hardware modules, including e.g. one or more processors, and/or one or more software modules for performing said methods and/or actions.

The communication device 900 may further comprise a memory 902 that may comprise, such as contain or store, a computer program 903. The computer program 903 comprises 'instructions' or 'code' directly or indirectly executable by the communication device 900 so that it performs said methods and/or actions. The memory 902 may comprise one or more memory units and may further be arranged to store data, such as configurations and/or applications involved in or for performing functions and actions of embodiments herein.

Moreover, the communication device 900 may comprise a processing circuit 904 as an exemplifying hardware module and may comprise or correspond to one or more processors. In some embodiments, the processing module 901 may comprise, e.g. 'is embodied in the form of' or 'realized by' the processing circuit 904. In these embodiments, the memory 902 may comprise the computer program 903 executable by the processing circuit 904, whereby the communication device 900 is operative, or configured, to perform said method and/or actions.

Typically the communication device 900, e.g. the processing module 901, comprises an Input/Output (I/O) module 905, configured to be involved in, e.g. by performing, any communication to and/or from other units and/or nodes, such as sending and/or receiving information to and/or from other nodes or devices. The I/O module 905 may be exemplified by an obtaining, e.g. receiving, module and/or a providing, e.g. sending, module, when applicable.

Further, in some embodiments, the communication device 900, e.g. the processing module 901, comprises one or more of a receiving module 906, an identifying module 907 and a sending module 908 as exemplifying hardware and/or software module(s). These modules may be fully or partly implemented by the processing circuit 904.

The communication device 900, and/or the processing module 901, and/or the processing circuit 904, and/or the I/O module 905, and/or the receiving module 906, are operative, or configured, to receive, from the first RAT network node 110a, said request requesting the communication device 120a to provide said information that one or more network nodes of the second RAT, e.g. one or more of the second RAT network nodes 111a-b, identifiable by the communication device 120 a from downlink radio signals transmitted by said second RAT network nodes 111a-b.

Moreover, the communication device 900, and/or the processing module 901, and/or the processing circuit 904, and/or identifying module 907, are operative, or configured, to identify, in response to the received request, said one or more network nodes of the second RAT, e.g. the second RAT network node 111a, from downlink radio signals transmitted by said one or more network nodes of the second RAT, e.g. the second RAT network node 111a.

Further, the communication device 900, and/or the processing module 901, and/or the processing circuit 904, and/or the I/O module 905, and/or the sending module 908, are operative, or configured to send, to the first RAT network node 110a, in response to the received request, the requested information identifying the identified second RAT network node 111a.

FIGS. 10a-c are schematic drawings illustrating embodiments relating to a computer program that may be any one of the computer programs 503, 703, 903 and that comprises instructions that when executed by the processing circuits 504, 704, 904, respectively, and/or the processing modules 501, 701, 901, respectively, causes the arrangement 500, and/or the network node 700, and/or the communication device 900, to perform as described above.

In some embodiments there is provided a carrier, such as a data carrier, e.g. a computer program product, comprising any one or both of the computer programs 503, 703, 903. The carrier may be one of an electronic signal, an optical signal, a radio signal, and a computer readable medium. Any one, some or all of the computer programs 503, 703, 903 may thus be stored on the computer readable medium. By carrier may be excluded a transitory, propagating signal and the carrier may correspondingly be named non-transitory carrier. Non-limiting examples of the carrier being a computer-readable medium is a memory card or a memory stick 1001 as in FIG. 10a, a disc storage medium 1002 such as a CD or DVD as in FIG. 10b, a mass storage device 1003 as in FIG. 10c. The mass storage device 1003 is typically based on hard drive(s) or Solid State Drive(s) (SSD). The mass storage device 1003 may be such that is used for storing data accessible over a computer network 1004, e.g. the Internet or a Local Area Network (LAN).

Any one, some or all of the computer programs 503, 703, 903 may furthermore be provided as a pure computer program or comprised in a file or files. The file or files may be stored on the computer-readable medium and e.g. available through download e.g. over the computer network 1004, such as from the mass storage device 1003 via a server. The server may e.g. be a web or File Transfer Protocol (FTP) server. The file or files may e.g. be executable files for direct or indirect download to and execution on the arrangement 500 and/or the network node 700 and/or the communication device 900, to perform as described above, e.g. by any one, some or all of the processing circuits 504, 704. 904. The file or files may also or alternatively be for intermediate download and compilation involving the same or another processor to make them executable before further download and execution causing the arrangement 500 and/or the network node 700 and/or the communication device 900 to perform as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors make the arrangement 500 and/or the network node 700 and/or the communication device 900 to be configured to and/or to perform the above-described first method, second method and third method, respectively.

Identification, e.g. by any identifier, herein may be implicit or explicit. The identification may be unique in the wireless communication network 100 or at least in a meaningful and relevant part or area thereof, as realized by the skilled person.

As used herein, each of the term "node", or "network node", "device", "arrangement" may refer to one or more physical entities, such as devices, apparatuses, computers, servers or the like. This may mean that any embodiment herein may be implemented in a single physical entity or alternatively, may be implemented in a plurality of physical entities, such as a system or arrangement comprising said one or more physical entities, i.e. some embodiments herein may be implemented in a distributed manner, such as on a set of interconnected devices, e.g. server machines of a cloud system, also known as e.g. computer cloud.

Note that in case it is possible and/or suitable, one or more embodiments herein, e.g. relating to one or more methods and/or entities, can be implemented in one and the same physical arrangement or entity.

As used herein, the term "unit" may refer to one or more functional units, each of which may be implemented as one or more hardware modules and/or one or more software modules in a node.

As an example, the expression "means" may be a module corresponding to the modules listed above in conjunction with the figures.

The term "network node" as used herein may as such in principle refer to any type of radio network node (described below) or any network node, which may communicate with at least a radio network node. Examples of such network nodes include any radio network node stated above, a core network node, an Operations & Maintenance (O&M) node, an Operations Support Systems (OSS) node, an Operation, Administration and Maintenance (OAM) node, a Self Organizing Network (SON) node, a positioning node etc. The term "radio network node" as used herein may as such refer to a network node comprised in a RAN, and is typically of a certain RAT, or any type of network node serving a wireless device, e.g. UE, and/or that are connected to and operating with other network node(s) or network element(s) or any radio node in order to send and/or receive radio signals to/from a communication device. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in distributed antenna system (DAS) etc.

The term "communication device" as used herein, may as such refer to any type of communication device arranged to communicate with a radio network node in a wireless, communication network, such as the wireless communication network 100. Examples may include so called: device to device UE, device for Machine Type of Communication (MTC), MTC device, machine type UE or UE capable of machine to machine (M2M) communication, Personal Digital Assistant (PDA), iPAD, Tablet, mobile terminals, smart phone, Laptop Embedded Equipment (LEE), Laptop Mounted Equipment (LME), Universal Serial Bus (USB) dongles etc, just to mention some examples. While said terms are used frequently herein for convenience, or in the context of examples involving other 3GPP nomenclature, it must be appreciated that the term as such is non-limiting and the teachings herein apply to essentially any type of communication device.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that enumerating terminology such as first method, second method, and first arrangement, second arrangement, etc., and the like, as may be used herein, as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method for identifying network nodes of a first Radio Access Technology (RAT) and of a wireless communication network, which network nodes are at least potentially neighboring each other, the method comprising:
obtaining multiple information sets comprising a first information set and a second information set, wherein the first information set is a) associated with a first communication device supporting both the first RAT and a second RAT and b) identifies i) a first network node of the first RAT and ii) a one or more network nodes of the second RAT that have been identified by the first communication device when the first communication device was associated with a communicative connection to said first network node of the first RAT, and wherein the second information set is a) associated with a second communication device supporting both the first RAT and the second RAT and b) identifies i) a second network node of the first RAT and ii) one or more network nodes of the second RAT that have been identified by the second communication device when the second communication device was associated with a communicative connection to said second network node of the first RAT; and
identifying, based on the obtained multiple information sets, network nodes of the first RAT that are at least potentially neighboring each other.

2. The method of claim 1, wherein said method is performed by the wireless communication network, one or more nodes thereof, or by one or more external nodes.

3. The method of claim 1, wherein the step of identifying network nodes of the first RAT that are at least potentially neighboring each other comprises determining whether a network node of the second RAT that is identified by the first information set is also identified by the second information set.

4. The method of claim 1, wherein the one or more network nodes of the second RAT that have been identified by the first communication device have been identified by the first communication deice from downlink radio signals transmitted by said one or more network nodes.

5. The method of claim 4, wherein
the first information set associated with the first communication device further comprises measurement data from measurements made by the first communication device on said downlink radio signals, and
the second information set associated with the second communication device further comprises measurement data from measurements made by the second communication device on said downlink radio signals.

6. The method of claim 5, wherein the step of identifying network nodes of the first RAT that are at least potentially neighboring each other comprises determining whether the first network node of the first RAT is at least potentially neighboring the second network node of the first RAT, wherein determining whether the first network node of the first RAT is at least potentially neighboring the second network node of the first RAT comprises:
obtaining from the first information set information identifying a particular network node of the second RAT, thereby determining that the first information set identifies the particular network node of the second RAT;
obtaining from the first information set first measurement data from measurements made by the first communication device on a downlink radio signal transmitted by the particular network node of the second RAT;
determining that the second information set also identifies the particular network node of the second RAT;
obtaining from the second information set second measurement data from measurements made by the second communication device on a downlink radio signal transmitted by the particular network node of the second RAT;
determining whether the first and second measurement data satisfy a predefined criteria.

7. The method of claim 1, wherein the multiple information sets are obtained by being received from one or more network nodes of the first RAT.

8. The method of claim 1, wherein the method further comprises:
initiating to send, to at least one of the network nodes of the first RAT, information about the network nodes of the first RAT identified as at least potentially neighboring each other.

9. A computer program product comprising a non-transitory computer readable medium storing instructions that when executed by an arrangement causes the arrangement to perform the method of claim 1.

10. An arrangement for identifying network nodes of a first Radio Access Technology (RAT) and of a wireless communication network, which network nodes are at least potentially neighboring each other, wherein said arrangement is configured to:
obtain multiple information sets comprising a first information set and a second information set, wherein the first information set is a) associated with a first communication device supporting both the first RAT and a second RAT and b) identifies i) a first network node of the first RAT and ii) a one or more network nodes of the second RAT that have been identified by the first communication device when the first communication device was associated with a communicative connection to said first network node of the first RAT, and wherein the second information set is a) associated with a second communication device supporting both the first RAT and the second RAT and b) identifies i) a second network node of the first RAT and ii) one or more network nodes of the second RAT that have been identified by the second communication device when the second communication device was associated with a communicative connection to said second network node of the first RAT; and
identify, based on the obtained multiple information sets, the network nodes of the first RAT that are at least potentially neighboring each other.

11. The arrangement of claim 10, wherein the identification that the network nodes of the first RAT are potentially neighboring each other is based on that the information sets identifying these network nodes of the first RAT are identifying the same one or more network nodes of the second RAT.

12. The arrangement of claim 10, wherein the one or more network nodes of the second RAT have been identified by the communication device from downlink radio signals transmitted by said one or more network nodes of the second RAT.

13. The arrangement of claim 12, wherein each information set associated with a communication device also comprises measurement data from measurements made by the communication device on said downlink radio signals.

14. The arrangement of claim 13, wherein the identification that the network nodes of the first RAT are potentially neighboring each other is based that the information sets identifying these network nodes of the first RAT are identifying the same one or more network nodes of the second RAT, and for which one or more network nodes of the second RAT the measurement data indicate a sufficient signal audibility according to a predefined criteria.

15. The arrangement of claim 10, wherein the arrangement is further configured to obtain the multiple information sets by receiving them from one or more network nodes of the first RAT.

16. The arrangement of claim 10, wherein the arrangement is further configured to:
   initiate to send, to at least one of the network nodes of the first RAT, information about the network nodes of the first RAT identified as at least potentially neighboring each other.

* * * * *